US011675104B2

(12) United States Patent
Chen et al.

(10) Patent No.: US 11,675,104 B2
(45) Date of Patent: Jun. 13, 2023

(54) IN-BAGGAGE OBJECT DETECTION USING COMMODITY WI-FI

(71) Applicant: Rutgers, The State University of New Jersey; Office of Research Commercialization, Piscataway, NJ (US)

(72) Inventors: Yingying Chen, Piscataway, NJ (US); Chen Wang, North Brunswick, NJ (US); Jian Liu, North Brunswick, NJ (US); Hongbo Liu, Indianapolis, IN (US); Yan Wang, Binghamton, NY (US)

(73) Assignees: Rutgers, The State University of New Jersey., New Brunswick, NJ (US); The Trustees of Indiana University, Bloomington, IN (US); The Research Foundation for The State University of New York, Binghamton, NY (US)

( * ) Notice: Subject to any disclaimer, the term of this patent is extended or adjusted under 35 U.S.C. 154(b) by 449 days.

(21) Appl. No.: 16/835,911

(22) Filed: Mar. 31, 2020

(65) Prior Publication Data

US 2020/0319371 A1 Oct. 8, 2020

Related U.S. Application Data

(60) Provisional application No. 62/828,151, filed on Apr. 2, 2019.

(51) Int. Cl.
*G01V 8/00* (2006.01)
*G01V 8/20* (2006.01)

(52) U.S. Cl.
CPC ............... *G01V 8/005* (2013.01); *G01V 8/20* (2013.01)

(58) Field of Classification Search
CPC .......... G01V 8/005; G01V 8/20; G01N 21/84; G01N 21/59
See application file for complete search history.

(56) References Cited

U.S. PATENT DOCUMENTS

2019/0278000 A1* 9/2019 Schneebeck ....... G01N 21/3581

OTHER PUBLICATIONS

X. Wang, C. Yang and S. Mao, "PhaseBeat: Exploiting CSI Phase Data for Vital Sign Monitoring with Commodity WiFi Devices," 2017 IEEE 37th International Conference on Distributed Computing Systems (ICDCS), 2017, pp. 1230-1239, doi: 10.1109/ICDCS.2017.206. (Year: 2017).*

(Continued)

*Primary Examiner* — Bernarr E Gregory
*Assistant Examiner* — Yonghong Li
(74) *Attorney, Agent, or Firm* — Lerner David LLP

(57) ABSTRACT

A system and method for detecting a suspicious object, including a wireless signal transmitter with first and second transmitter antennas, a first wireless signal receiver on an opposite side of the object from the transmitter having first and second receiver antennas, and a second wireless signal receiver on a same side of the object as the transmitter having a third receiver antenna. The transmitter may emit wireless signals from each of the transmitter antennas. The signals emitted by the first transmitter antenna may be received at the first and second receiver antennas. The signals emitted by both transmitter antennas may be received at the third receiver antenna. The object's material type may be determined based on channel state information of the wireless signals received at first receiver. A size of the object may be determined based on channel state information of the wireless signals received at the second receiver.

24 Claims, 13 Drawing Sheets

(56) References Cited

OTHER PUBLICATIONS

K. Wu, "Wi-metal: Detecting metal by using wireless networks," 2016 IEEE International Conference on Communications (ICC), 2016, pp. 1-6, doi: 10.1109/ICC.2016.7511472. (Year: 2016).*

X. Wang, L. Gao and S. Mao, "CSI Phase Fingerprinting for Indoor Localization With a Deep Learning Approach," in IEEE Internet of Things Journal, vol. 3, No. 6, pp. 1113-1123, Dec. 2016, doi: 10.1109/JIOT.2016.2558659. (Year: 2016).*

C. Sun, F. Gao, H. Liu, S. Xu and J. An, "A Radio Tomographic Imaging Method Using Channel State Information and Image Fusion," 2018 8th International Conference on Electronics Information and Emergency Communication (ICEIEC), 2018, pp. 223-227, doi: 10.1109/ICEIEC.2018.8473507. (Year: 2018).*

A. Hanif et al., "Non-Obtrusive Detection of Concealed Metallic Objects Using Commodity WiFi Radios," 2018 IEEE Global Communications Conference (GLOBECOM), 2018, pp. 1-6, doi: 10.1109/GLOCOM.2018.8647871. (Year: 2018).*

* cited by examiner

IN-BAGGAGE OBJECT DETECTION USING COMMODITY WI-FI

CROSS-REFERENCE

The present application claims the benefit of the filing date of U.S. Provisional Patent Application No. 62/828,151 filed Apr. 2, 2019, the disclosure of which is hereby incorporated herein by reference.

STATEMENT REGARDING FEDERALLY SPONSORED RESEARCH OR DEVELOPMENT

This invention was made with government support under grant number 1820624 awarded by the National Science Foundation, and grant number W911NF-17-1-0467 awarded by the Army/ARO. The government has certain rights in the invention.

BACKGROUND OF THE INVENTION

Systems and techniques for detecting dangerous objects (e.g., lethal weapons, homemade-bombs, explosive chemicals) hidden in baggage have been developed to improve public security and safety. Traditionally, the systems and techniques require specialized equipment (e.g., X-ray machine, CT scanner, etc.) and further require manual inspection of the data collected by the specialized equipment. However, these systems and techniques are expensive due to equipment and labor costs, and further are subject to human error.

BRIEF SUMMARY OF THE INVENTION

The present disclosure provides an automated system and example routines capable of classifying objects as dangerous using readily publically available commercial equipment, such as commodity Wi-Fi routers or other wireless radio frequency (RF) signal generators. Wireless signals emitted from a transmitter are received by a receiver, and the channel state information of the wireless signals is analyzed to detect properties of an interfering object. In particular, the present disclosure makes use of reconstructed CSI complex values in order to accurately classify objects.

The systems and methods specified in this disclosure are designed for detecting dangerous objects in baggage. They can also be utilized to recognize various objects that are not inside of baggage. More specifically, when the objects are not inside of baggage, the systems and methods specified in this disclosure can be utilized to identify the material of the objects and estimate their dimensions such as their shapes, volumes, or both. Example application scenarios for these systems and methods include, but are not limited to, suspicious object detection in security systems, automatic object recognition in logistics management, environment learning for robots and drones, and floor mapping and visualization.

One aspect of the disclosure is directed to a method of detecting a suspicious object using at least one or more wireless signal transmitters including at least a first transmitter antenna and a second transmitter antenna and a third transmitter antenna, one or more wireless signal receivers including at least a first receiver antenna and a second receiver antenna and a third receiver antenna. The first and second receiver antennas may be positioned on a side of the object that is opposite the first transmitter antenna, and the third receiver antenna may be positioned on a same side of the object as the second and third transmitter antennas. The method may involve the one or more wireless signal transmitters emitting wireless signals from each of the first transmitter antenna, the second transmitter antenna and the third transmitter antenna, the one or more wireless signal receivers receiving at least the wireless signal emitted by the first transmitter antenna at each of the first receiver antenna and the second receiver antenna, the one or more wireless signal receivers receiving the wireless signals emitted by each of the second transmitter antenna and the third transmitter antenna at the third receiver antenna, determining a type of material of the object based on channel state information of the wireless signals received at the first receiver antenna and the second receiver antenna, determining a size of the object based on channel state information of the wireless signals received at the third receiver antenna, and determining whether the object is a suspicious object based on each of the type of material of the object and the size of the object.

In some examples, determining the type of material of the object further may involve determining whether the object is (i) one of a metal or a liquid, or is (ii) a type of material other than a metal or a liquid. Determining the type of material of the object may further involve determining whether the object is a metal or is a liquid.

Additionally or alternatively, determining the type of material of the object may involve determining a first complex value of the channel state information of the wireless signal received at the first receiver antenna, determining a second complex value of the channel state information of the wireless signal received at the second receiver antenna, and calculating a complex difference value that is a difference between the first complex value and the second complex value. The determination may be based on any one or a combination of the first complex value, the second complex value, and the complex difference value. Determining the type of material of the object may further involve comparing each of the first complex value, the second complex value and the complex difference value to a plurality of predetermined sets of first complex, second complex and complex difference values, each predetermined set of values corresponding to a type of material or a group of types of materials, and selecting the type of material or the group of types of materials having the predetermined set of values closest to the first complex value, the second complex value and the complex difference value. In some examples, the first complex value may be determined by performing phase error correction for the channel state information of the wireless signal received at the first receiver antenna, performing phase error correction for the channel state information of the wireless signal received at second first receiver antenna, and reconstructing a complex form of the wireless signals received at the first receiver antenna and second receiver antenna based on the respective phase error corrections.

In some examples, the method may further involve a calibration stage in which the wireless signal transmitter emits calibration wireless signals from each of the first transmitter antenna and the second transmitter antenna, the second wireless signal receiver receives the calibration wireless signals emitted by each of the first transmitter antenna and the second transmitter antenna at the third receiver antenna, and each of a first estimated channel state of the first transmitter antenna and a second estimated channel state of the second transmitter antenna are determined based on the received calibration wireless signals. Determining the size of the object may be based on the first estimated channel state and the second estimated channel state. In some examples, determining the size of the object may further involve determining a first amplitude of the wireless signal received at the third receiver antenna from the first transmitter antenna, determining a second amplitude of the wireless signal received at the third receiver antenna from the second transmitter antenna, determining a weighted second amplitude that is the second amplitude multiplied by a ratio of the first estimated channel state to the second estimated channel state, and calculating a reflection channel response that is a difference between the first amplitude and the weighted second amplitude. The size of the object may be further based on the reflection channel response. A greater reflection channel response may be indicative of the size of the object being larger.

In some examples, the wireless signals may be emitted and received by the transmitter and receiver antennas while the object is moving. The method may then involve repeatedly determining a size of the object based on channel state information of the wireless signals received at the third receiver antenna as the object is moving, constructing a profile of the repeatedly determined size of the object, comparing the constructed profile to a plurality of predetermined shape profiles, each predetermined shape profile corresponding to a type of shape selecting the predetermined shape profile having a value closest to constructed profile, and determining a shape of the object based on the selected predetermined shape profile. Whether the object is a suspicious object may be determined based on the determined shape of the object.

In some examples, the first transmitter antenna and the second transmitter antenna may be the same antenna. In some examples, the second receiver antenna and the third receiver antenna may be the same antenna.

Another aspect of the disclosure is directed to a computer-readable non-transitory medium storing instructions for instructing a processor to execute any of the methods described herein.

Yet another aspect of the disclosure is directed to a system for detecting a suspicious object. The system may include one or more wireless signal transmitters including at least a first transmitter antenna, a second transmitter antenna and a third transmitter antenna, the one or more wireless signal transmitters configured to emit wireless signals from each of the first transmitter antenna, the second transmitter antenna and the third transmitter antenna, one or more wireless signal receivers including at least a first receiver antenna, a second receiver antenna and a third receiver antenna, the first and second receiver antennas being positioned to be on a side of the object that is opposite the first transmitter antenna, and configured to receive at least the wireless signal emitted by the first transmitter antenna, the third receiver antenna being positioned to be on a same side of the object as the second and third transmitter antennas, and configured to receive the wireless signals emitted by each of the second transmitter antenna and the third transmitter antenna; and a processor. The processor may be configured to determine a type of material of the object based on channel state information of the wireless signals received at the first receiver antenna and the second receiver antenna, determine a size of the object based on channel state information of the wireless signals received at the third receiver antenna, and determine whether the object is a suspicious object based on each of the type of material of the object and the size of the object.

In some examples, the processor may be further configured to determine a first complex value of the channel state information of the wireless signal received at the first receiver antenna, determine a second complex value of the channel state information of the wireless signal received at the second receiver antenna, and calculate a complex difference value that is a difference between the first complex value and the second complex value. The determined type of material of the object may be based on any one or combination of the first complex value, the second complex value, and the complex difference value.

In some examples, the processor may be further configured to compare each of the first complex value, the second complex value and the complex difference value to a plurality of predetermined sets of first complex, second complex and complex difference values, each predetermined set of values corresponding to a type of material or a group of types of materials, and select the type of material or the group of types of materials having the predetermined set of values closest to the first complex value, the second complex value and the complex difference value.

In some examples, the processor may be further configured to perform phase error correction for the channel state information of the wireless signal received at the first receiver antenna, perform phase error correction for the channel state information of the wireless signal received at second first receiver antenna, and reconstruct a complex form of the wireless signals received at the first receiver antenna and second receiver antenna based on the respective phase error corrections.

In some examples, the processor may be further configured to, at a calibration stage, determine each of a first estimated channel state of the first transmitter antenna and a second estimated channel state of the second transmitter antenna based on calibration wireless signals emitted from each of the first transmitter antenna and the second transmitter antenna and received at the third receiver antenna. The size of the object may be determined based further on the first estimated channel state and the second estimated channel state.

In some examples, the processor may be further configured to determine a first amplitude of the wireless signal received at the third receiver antenna from the first transmitter antenna, determine a second amplitude of the wireless signal received at the third receiver antenna from the second transmitter antenna, determine a weighted second amplitude that is the second amplitude multiplied by a ratio of the first estimated channel state to the second estimated channel state, and calculate a reflection channel response that is a difference between the first amplitude and the weighted second amplitude. The size of the object may be determined based further on the reflection channel response.

In some examples, the processor may be further configured to repeatedly determine the size of the object as the object moves. For instance, the processor may be configured to repeatedly determine a size of the object based on channel state information of the wireless signals received at the third receiver antenna as the object is moving, construct a profile of the repeatedly determined size of the object, compare the constructed profile to a plurality of predetermined shape profiles, each predetermined shape profile corresponding to a type of shape, select the predetermined shape profile having a value closest to constructed profile; and determine a shape of the object based on the selected predetermined shape profile, wherein the processor is configured to determine whether the object is a suspicious object based further on the determined shape of the object.

In some examples, the first transmitter antenna and the second transmitter antenna may be the same antenna. In some examples, the second receiver antenna and the third receiver antenna may be the same antenna.

DETAILED DESCRIPTION

Figure 1:
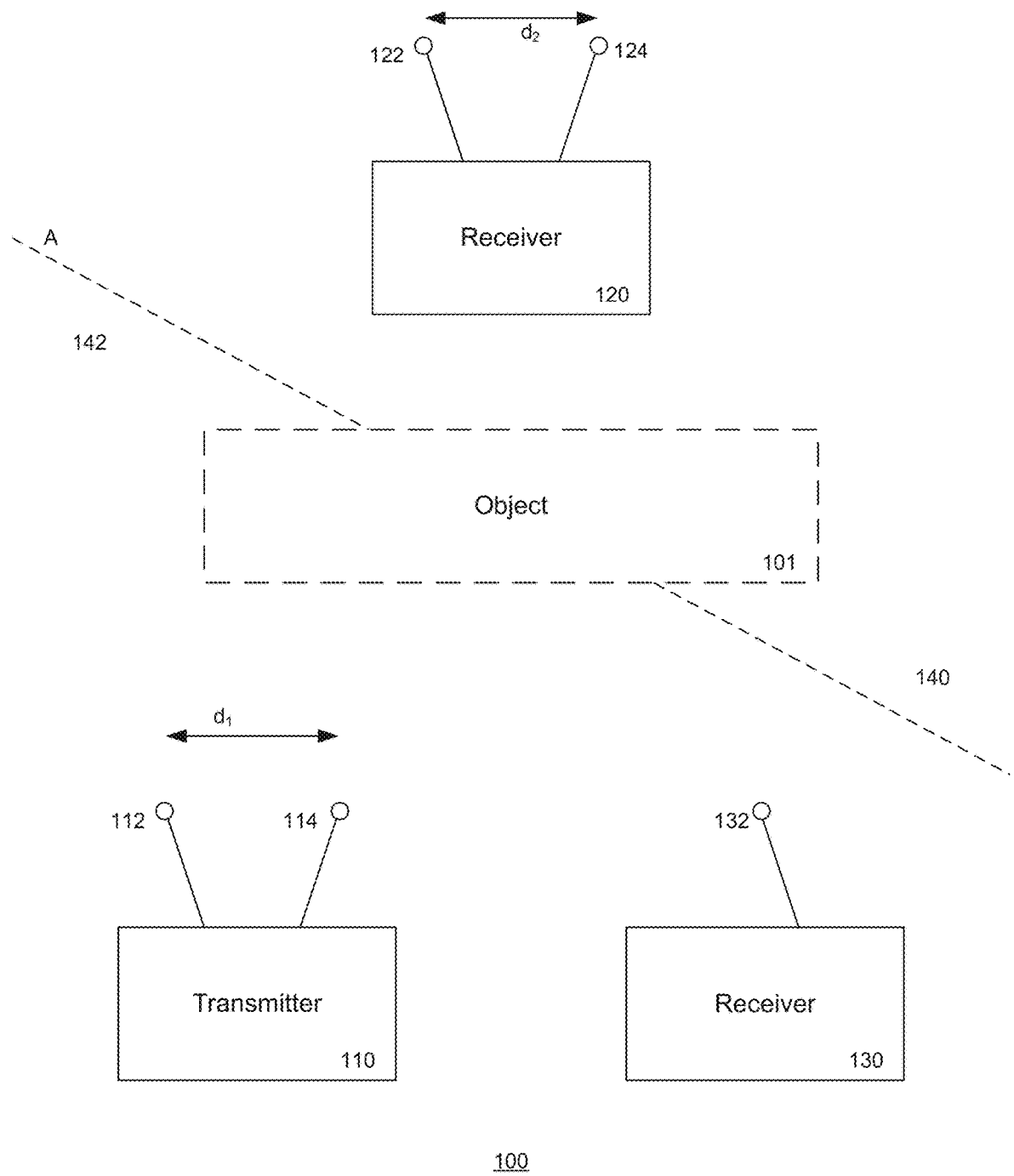
FIG. 1 is a schematic diagram of an example system for detecting a suspicious object in accordance with an aspect of the disclosure.

The present disclosure utilizes wireless RF signals, such as commodity Wi-Fi signals, transmitted from a wireless signal transmitter and received by a wireless signal receiver in order to detect and classify objects that interact with the transmitted Wi-Fi signals. Although the disclosure refers to Wi-Fi signals as a matter of example, it will be understood that the same or similar principles may be applied to many other types of wireless RF signals.

Interaction between a Wi-Fi signal and a given object can be either reflection (in which the signal bounces off the object) or refraction (in which the signal passes through the object). Even when a Wi-Fi signal passes through an object, there is still some level of interaction with—or interference from—the object. The amount of interaction or interference that occurs in the refracted signals due to the presence of the object can be measured based on the signals received at a receiver positioned on the other side of the object from the transmitter. Conversely, the amount of reflection that occurs due to the presence of the object can be measured based on the signals received at a receiver positioned on the same side of the object as the transmitter.

For purposes of the present disclosure, the "same side" of an object is generally understood to mean any location where reflected signals may be reflected to, and the "other side" of the object is generally understood to mean any location where refracted signals may reach. These "sides" are crudely illustrated, for purpose of example, in FIG. 1, in which an object 101 is positioned within a system 100 having a wireless signal transmitter 110 and two wireless signal receivers 120, 130, whereby imaginary line A is drawn roughly perpendicular to a direction from the transmitter 110 to the object 101, whereby a receiver that is positioned to be on an opposite side 140 of the imaginary line A as the transmitter 110 (e.g., receiver 120) may be capable of receiving the refracted signals, and a receiver that is positioned to be on a same side 142 of the imaginary line A as the transmitter 110 (e.g., receiver 130) may be capable of receiving the reflected signals.

In the example system 100 of FIG. 1, each of the transmitter 110 and the first receiver 120 may include two separate antennas: first antenna 112 and second antenna 114 of the transmitter 110; and first antenna 122 and second antenna 124 of the first receiver 120. The second receiver 130 may include one antenna 132.

In the case of the transmitter 110, the antennas 112, 114 may be separated by a given distance $d_1$, such that the signals emitted from each antenna 112, 114 may interact with the object 101 differently en route to the receiver antennas. Similarly, the antennas 122, 124 of the first receiver 120 may be separated by a given distance $d_2$, such a signal emitted from one antenna of the transmitter 110 may interact differently en route to the antennas 122, 124.

The transmitter 110 and receivers 120, 130 may be coupled to a processor (not shown) having a memory capable of storing instructions for controlling operation of the transmitter and receivers, for controlling receiving data from the transmitter and receivers, for controlling analyzing the received data, and for controlling outputting a result (e.g., whether an object is or is not suspicious, a type of material of the object, a size of the object, etc.) based on the analysis. The memory of the processor may further be capable of storing predetermined data that may be used in the analysis, such as the values, value ranges, threshold values, and other figures and measurements described herein. In some instances, the processor may be any processor, microprocessor or other computer or processing means known in the art with the aforesaid communication, control and storage capabilities.

The example system of FIG. 1 may be operated using the routines described herein. It should be understood that the following operations do not have to be performed in the precise order described below. Rather, various operations can be handled in a different order, or simultaneously. Moreover, operations may be added or omitted.

Figure 2:
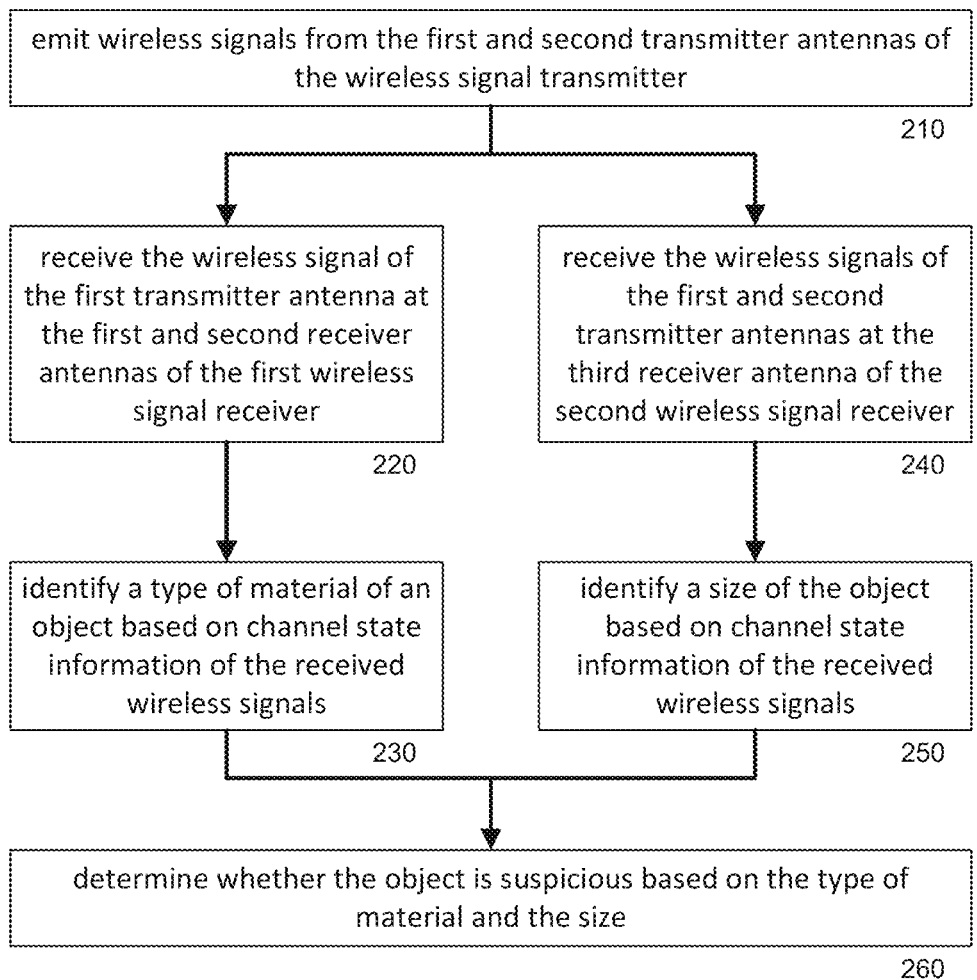
FIG. 2 is a flow diagram of an example routine for detecting a suspicious object in accordance with an aspect of the disclosure.

FIG. 2 illustrates an example routine 200 for detecting a suspicious object. At block 210, the wireless signal transmitter 110 may emit wireless signals from each of the first and second antennas 112, 114. The emitted signals may identical, but as noted above, the antennas may be positioned at a distance $d_1$ apart, such that the signals may interact with the object 101 differently.

At block 220, the first wireless signal receiver 120 may receive the emitted wireless signals at each of the first and second antennas 122, 124. At block 230, a type of material of the object 101 may be determined based on channel state information of the received wireless signals. An example of this determination is described below in connection with FIGS. 3-7.

At block 240, the second wireless signal receiver 130 may receive the emitted wireless signals from each of the first and second antennas 112, 114. At block 250, a size of the object 101 may be determined based on channel state information of the received wireless signals. An example of this determination is described below in connection with FIGS. 8-15.

At block 260, a determination as to whether the object 101 is suspicious may be made based on the determined type of material and the determined size. For example, if it is determined that the type of material of the object is determined to be either metal or liquid, then the object may be suspicious, whereas if the type of material of the object is determined to be not metal and not liquid, then the object may be deemed safe. For further example, if the object is determined to be of a sufficiently small size (e.g., a volume of liquid deemed safe), then the object may be deemed safe. Conversely, if the object is determined to be larger, then it may be deemed suspicious.

In the example of FIG. 2, blocks 220/230 and 240/250 are shown in parallel. However, in other examples, these steps may be performed in sequence. Furthermore, in some instances, a decision whether to perform the operations of blocks 240/250 may be based on a determination from blocks 220/230. That is, if a type of material of the object is deemed safe, then there may not be any need to determine the object's size.

Additionally, in the example of FIG. 2, blocks 220 and 240 are shown as relying on the same wireless signals emitted by the transmitter. However, it is not necessary for the first and second receivers to receive the same signals. In another example, first wireless signals may be emitted at one time and a type of material of the object may be determined based on the channel state information of the first wireless signals received at the first receiver 120, and second wireless signals may be emitted at a different time and a size of the object may be determined based on the channel state information of the second wireless signals received at the second receiver 130. As noted above, the second wireless signals may be transmitted only if a type of material of the object is deemed suspicious (e.g., metal, liquid).

Figure 3:
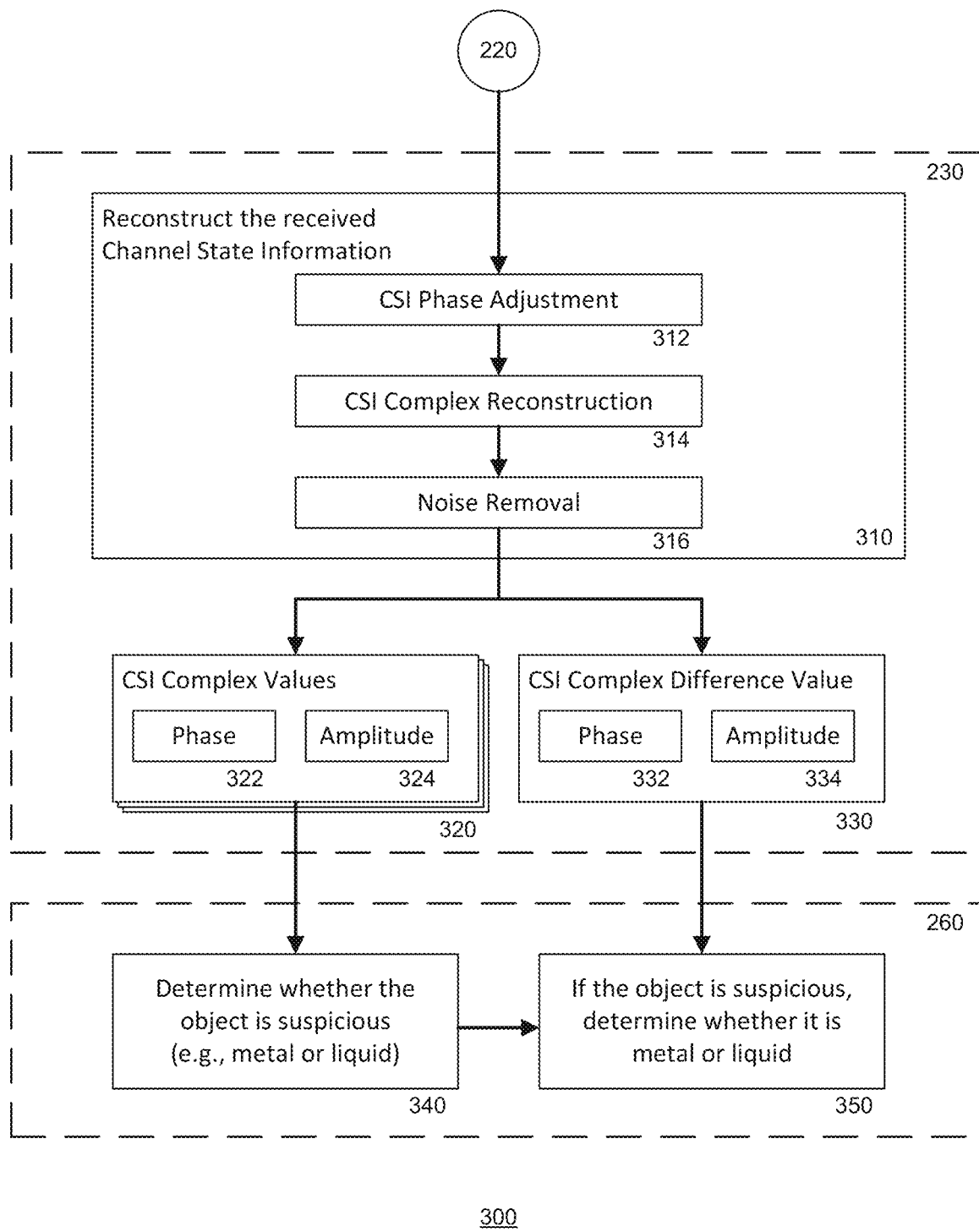
FIG. 3 is a flow diagram of an example subroutine of the routine of FIG. 2 in accordance with an aspect of the disclosure.

FIG. 3 illustrates an example subroutine 300 for determining a type of material on an object (e.g., block 230 of FIG. 2). The subroutine 300 may begin at block 310 with reconstruction of the channel state information (CSI) received at each antenna 122, 124 of the first receiver 120.

The CSI may be characterized as an angle and phase of a wireless signal. Additionally, the wireless signal may be characterized as multiple subcarrier signals, each subcarrier signal being centered at a respective central frequency. In this regard, the CSI for a given subcarrier signal having a central frequency $f_k$ may be characterized as follows:

$$H(f_k)=|H(f_k)|e^{j\angle H(f_k)} \quad (1)$$

where $H(f_k)$ is the channel response for the subcarrier signal, $|H(f_k)|$ connotes the amplitude of the channel response, and $e^{j\angle H(f_k)}$ connotes the phase of the channel response.

One challenge in using the phase component of the CSI extracted from the received wireless signals is that the data could be distorted by an unpredicted phase shift and time lag caused by the transmitter and receiver not being synchronized with one another. While the delay would not affect the amplitude values, the phase values could be greatly affected. This is demonstrated in FIG. 4, in which it can be seen that first any given subcarrier (e.g., S1, S4, S5, S15 or S25) the CSI amplitude value of the subcarrier remains mostly constant (hence the relatively constant distance from point 0,0), yet the phase value of the subcarrier varies across a full spectrum of possible phases (hence the ring shape).

One example approach for reconstructing CSI may begin at block 312 with a CSI phase adjustment or phase error correction, for instance using a phase unwrapping and linear transformation process. The phase information is first unwrapped across all subcarriers of each packet of data received. A linear transformation is then applied to the unwrapped phase information to remove the phase shift offset at each subcarrier. The resulting adjusted phase $\angle \hat{H}(f_k)$ may be expressed as follows:

$$\angle \hat{H}(f_k)=\angle H(f_k)-bf_k-a \quad (2)$$

in which $$a = \frac{1}{n}\sum_{k=1}^{n}\angle H(f_k) \text{ and} \quad (3)$$

$$b = \frac{\angle H(f_n) - \angle H(f_1)}{f_n - f_1} \quad (4)$$

in which there are n subcarrier signals, k being the index of the subcarrier signals.

At block 314, given the adjusted CSI phase, the complex form of the CSI may then be reconstructed as $$\hat{H}(f_k)=|\hat{H}(f_k)|e^{j\angle \hat{H}(f_k)} \quad (5)$$

The phase error correction and reconstruction may be performed for each of the wireless signals emitted by the transmitter and received at the receiver.

Figure 4:
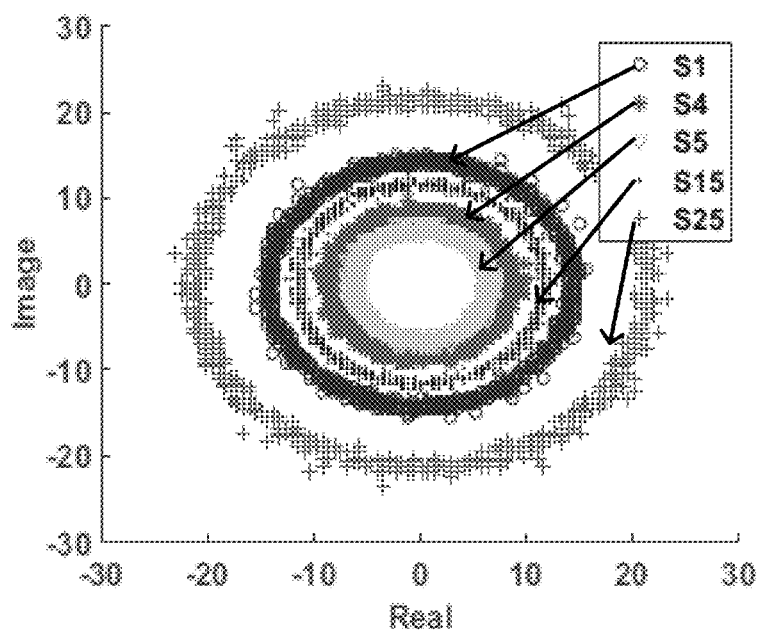
FIG. 4 is a graphical representation of channel state information for the subroutine of FIG. 3 in accordance with an aspect of the present disclosure.
Figure 5:
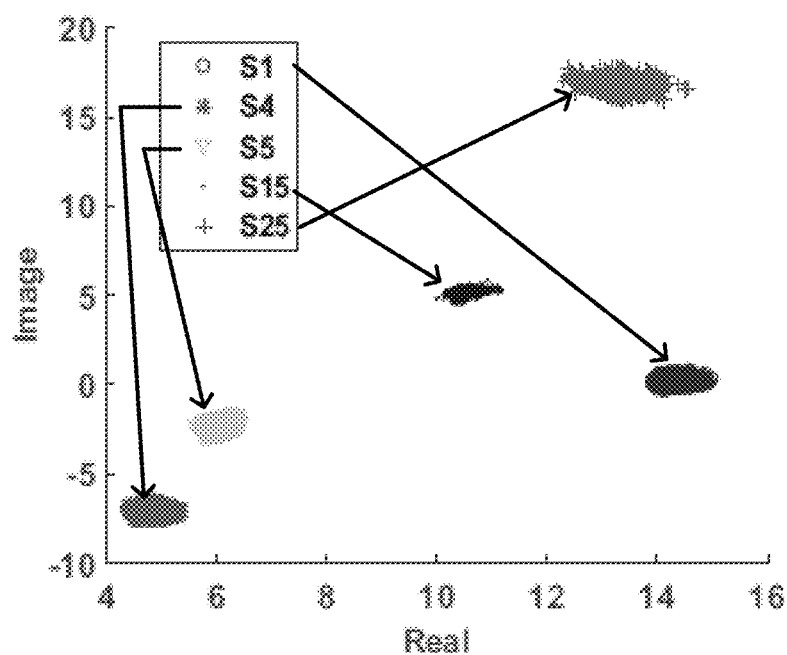
FIG. 5 is a graphical representation of the channel state information of FIG. 4 in a reconstructed form.

Finally, at block 316, noise may be removed from the received signal, resulting in reconstructed CSI complex values 320, including both amplitude data 322 and phase data 324, for each of the n subcarriers. To illustrate, the CSI values of FIG. 4 are shown in their reconstructed form in FIG. 5. Each subcarrier has a distinct range of complex values (including both real and imaginary components). These distinct ranges demonstrate that the complex CSI value can be derived from the wireless signals received at the receiver.

At block 340, the CSI complex values may be used to determine the type of material of the object. This is because certain materials, such as paper, cloth, plastics, etc., may allow a large portion of the wireless signal to penetrate and thus reach the receiver 120. Other materials, such as metal, may reflect a large portion of the signal and causes the rest of the signal to scatter along its surface. Other materials, such as liquid, may reflect some of the signal while allowing a portion of the signal to penetrate. Thus, these differences in interaction between various materials and wireless signals can be utilized to classify the different material types.

Figure 6:
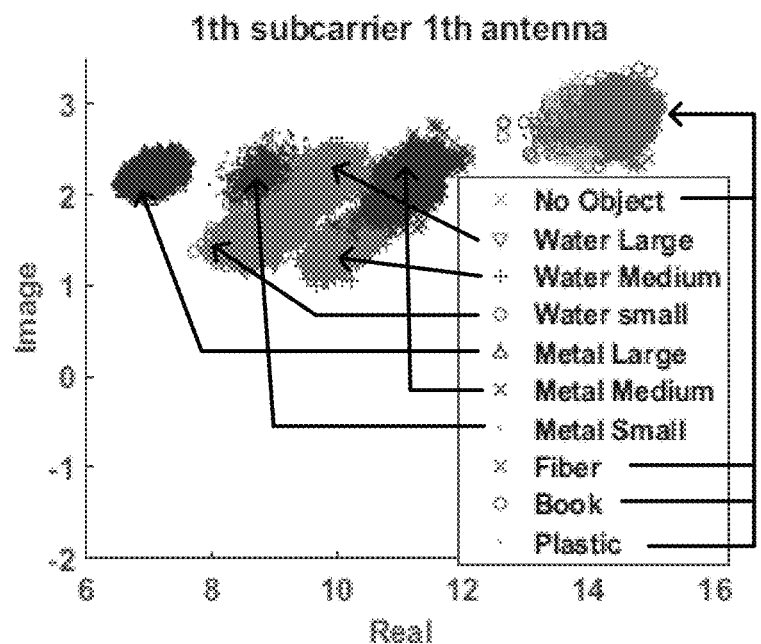
FIG. 6 is a graphical representation of a classification for various types of materials of detected objects based on channel state information values.

FIG. 6, for example, shows a classification of different materials based on their CSI complex values. In the example of FIG. 6, the CSI complex values for objects made of paper, cloth and plastics all fall roughly within the same range of CSI complex values (e.g., real component between 12 and 16, imaginary component between 2 and 3.5). By comparison, the CSI complex values for objects made of metal and liquid all fall within a different range of values (e.g., real component between 6 and 12, imaginary component between 1 and 2.5). Thus, the CSI complex values for a wireless signal received at even one antenna of a receiver 120 may be sufficient to classify an object as either: being made of paper, plastic or cloth; or being made of metal or liquid.

It should also be noted from FIG. 6 that the respective ranges of CSI complex values may also differ depending on whether an object was large or small. For instance, CSI complex values for a small liquid object are observed to fall roughly within the range of 7.5-9 for the real component and 1-2 for the imaginary component, whereas CSI complex values for a medium liquid object are observed to fall roughly within the range of 9-11 for the real component and 1-1.5 for the imaginary component. Nonetheless, there is still some overlap between these ranges. Additionally, it can be seen from FIG. 6 that differentiating liquid objects from metal objects may also be difficult due to the overlap in CSI complex values for wireless signals reflected by those types of materials.

Therefore, in order to more accurately distinguish metal from liquid, additional information may be derived from the CSI complex values. This can be accomplished by receiving the wireless signal at both antennas 122, 124 of the receiver 120 and determining a CSI complex difference value 330 (FIG. 3) of the wireless signal as received at each antenna. This CSI complex difference value 330, like the aforementioned CSI complex values, can include both a real component 332 and an imaginary component 334. The difference in CSI complex values from one antenna to the next can be used to determined properties of the scattering effects of a detected object. Furthermore, objects made of different materials cause different scattering effects. Thus, the CSI complex difference information can be useful for classifying material type.

A CSI complex difference value is defined by a combined channel $H_{t1,r1r2}$, in which t1 is the wireless signal emitted by the first antenna 112 of the transmitter 110, r1 is the wireless signal as received by the first antenna 122 of the receiver 120, and r2 is the wireless signal as received by the second antenna 124 of the receiver 120. For a transmitter antenna t1 that emits a symbol x, the symbols received by the two receiver antennas will be defined as $h_{11}x$ and $h_{12}x$ (where $h_{11}$ is the CSI for the t1r1 pair, and $h_{22}$ is the CSI for the t1r2 pair). The combined input may then be characterized as $(h_{11}+\alpha h_{12})x$, whereby $\alpha$ may be used to weight the CSI values of each receiver. In the present case, in which a difference of the CSI complex values is sought, a may equal −1, whereby the value of $H_{t1,r1r2}$ may thus be characterized as follows:

$$H_{t1,r1r2}=h_{11}-h_{12} \quad (6)$$

Figure 7:
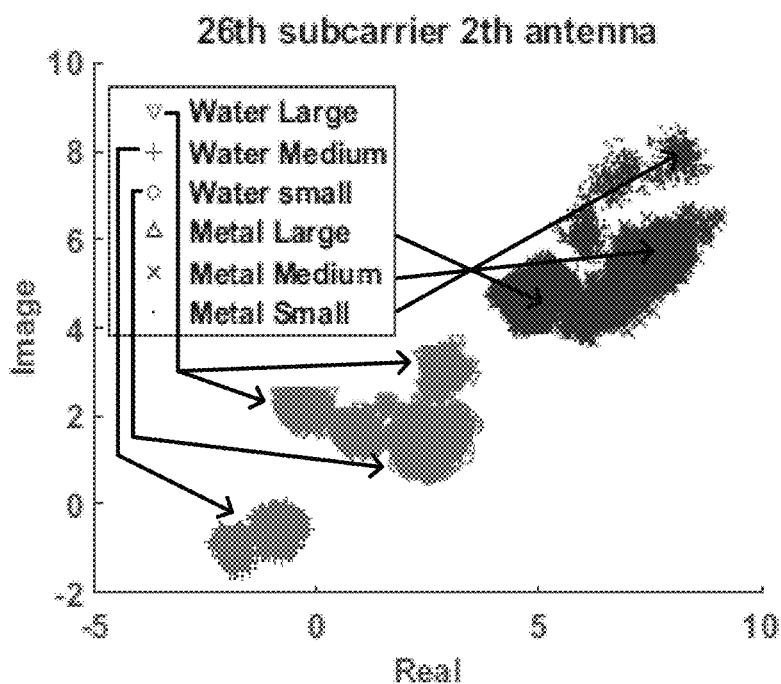
FIG. 7 is a graphical representation of a classification for types of materials of detected objects based on channel state information difference values.

FIG. 7 illustrates an example result of this difference value for the CSI complex values received at antennas 122, 124 of receiver 120. As can be seen in FIG. 7, the respective ranges of CSI complex difference values for each of metal objects and liquid objects no longer overlap with one another, and thus can be more accurately distinguished from one another and appropriately classified. For example, returning to FIG. 3, at block 350, the CSI complex difference value (or values) may be used, on their own or in combination with the CSI complex values from the two antennas, to determine whether an object is metal or is liquid. Stated another way, the object may be classified as a type of material of group of types of materials that has a predetermined set of values closest to one or any combination of the CSI complex values and CSI complex difference values.

In the example of FIG. 3, the determination of block 350 is based on that of block 340. That is, only when an object is determined to be made of either one of metal or liquid is the classification at block 350 carried out. In other examples, this classification can be carried out regardless of block 340. In further examples, the calculation of CSI complex difference information may itself only be carried out if at block 340 it is determined that an object is or may be suspicious.

In some situations, it may be enough to determine a type of material in order to determine whether an object is suspicious. However, in other circumstances, it may not be enough. For instance, in the case of flight regulations, only liquids greater than a certain quantity (e.g., 100 ml) may be considered suspicious. Therefore, it may also be desired to determine a size of the suspicious object.

Figure 8:
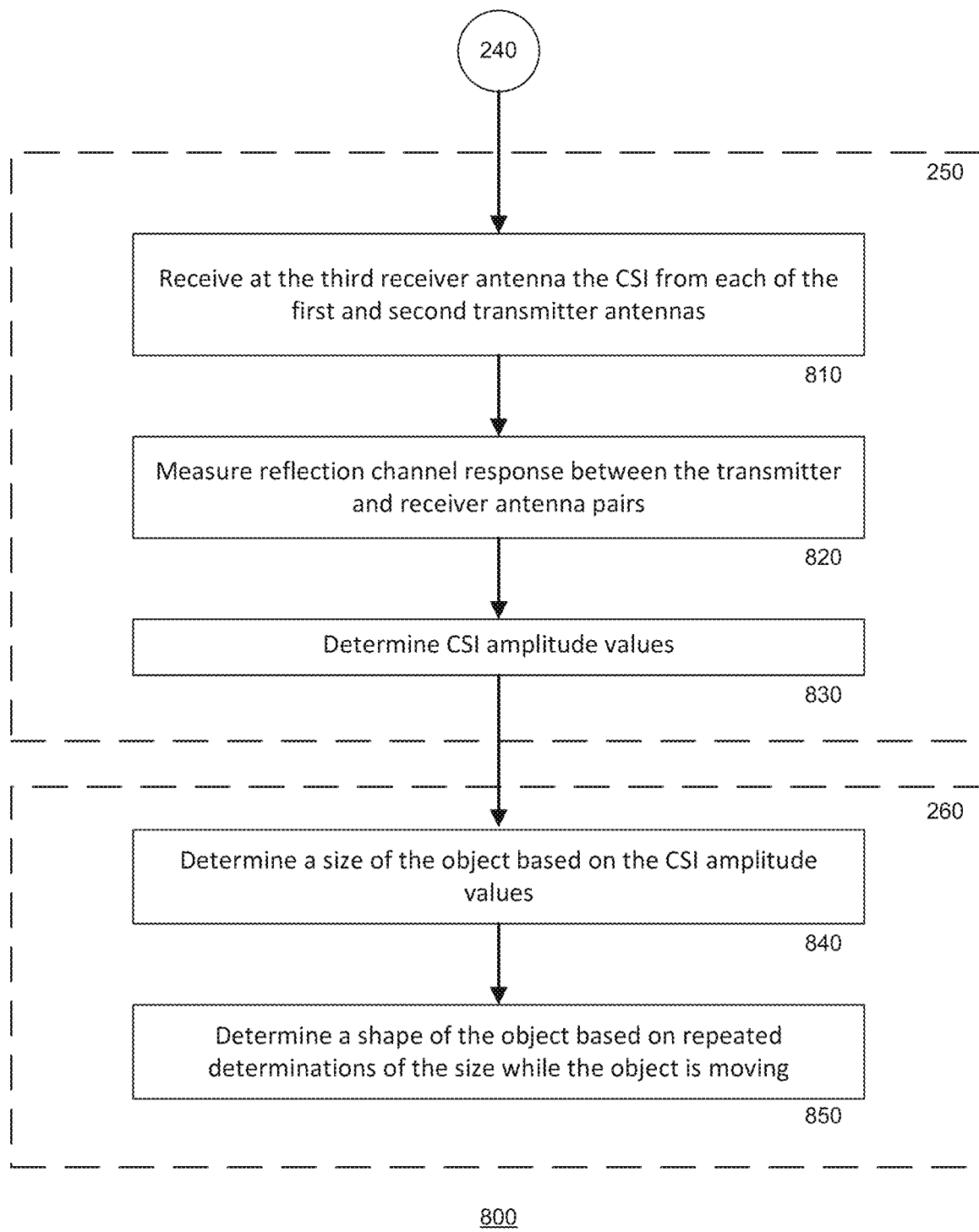
FIG. 8 is a flow diagram of another example subroutine of the routine of FIG. 2 in accordance with an aspect of the disclosure.

FIG. 8 illustrates an example subroutine 800 for determining object size (e.g., block 250 of FIG. 2). The subroutine 800 may begin at block 810 with receiving the channel state information (CSI) at the second receiver 130 from each antenna 112, 114 of the transmitter 110.

For purposes of determining object size, the transmitter and receiver are positioned to be on a same side of the object. Thus, an amount of the signal that is reflected is of greater concern than the refraction and scattering properties of the object. Refraction and scattering are of greater concern for determination of object type, in which the transmitter and receiver are positioned to be on opposing sides of the object. As a result, it is not necessarily required to reconstruct the phase of the reflected signal, since the amplitude of the reflected signal may be sufficient to determine the object size. That is, the size of an object can affect the amount of a signal that is reflected by the object, and thus can affect the strength of the reflected signal.

At block 820, a contribution of the object to the signal strength may be determined by measuring a reflection channel response between transmitter and receiver antenna pairs. For example, the reflection channel response for the wireless signals transmitted from the two transmitter antennas t1, t2 and received at the antenna of the second receiver r3 may be characterized as follows:

$$H_{t1t2,r3}=h_{1i}+\beta h_{2i} \quad (7)$$

in which $h_{1i}$ and $h_{2i}$ are the estimated CSI for the respective antenna pairs (in FIG. 1, antenna 112 to antenna 132, and antenna 114 to antenna 132, respectively), and $\beta$ is a weighted value that may be set during a calibration procedure. More particularly, $h_{1i}$ and $h_{2i}$ may be estimated channel state amplitudes if the phase components of the calibration CSI values are disregarded.

During the calibration procedure, it is assumed that there is no "object" present (fixed or background objects such as furniture may be present since those will also be present during the detection procedure). Thus, the CSI values during calibration may be characterized as $\hat{h}_{1i}$ and $\hat{h}_{2i}$, respectively, and may be thought of as CSI values for calibration signals that are transmitted between the transmitter and receiver. Either or both light-of-sight signal transfer or reflection off of fixed objects in the surrounding space may contribute to the CSI values of the calibration wireless signals. The difference in CSI amplitude values under such conditions may be characterized as follows:

$$\beta = -\frac{\hat{h}_{1i}}{\hat{h}_{2i}} \quad (8)$$

This $\beta$ value from the calibration procedure may then be used to correct (e.g., properly weight) the estimated CSI amplitude values when an object is present and determine how much of the wireless signal received at the receiver is being contributed by the presence of the object. In this sense, it is likely that the greater the contribution by the object to the CSI amplitude value received at the receiver, the greater in size the object is.

At block 830, the amplitudes of the reflected CSI for the signal subcarriers is determined. As noted above, the larger a volume of the object, the greater the reflected CSI is across all of the subcarriers due to the increasing size of the reflecting surface.

Figure 9:
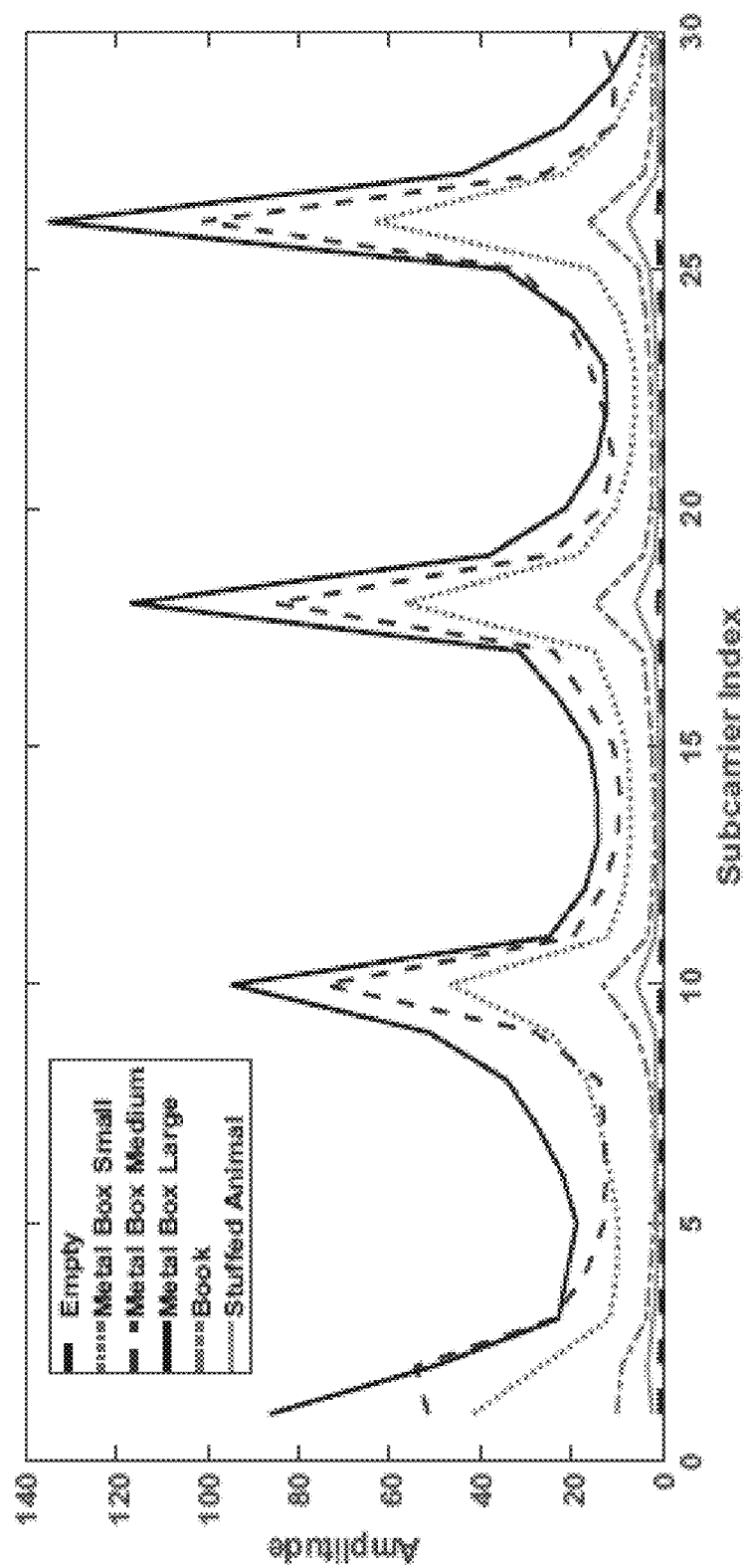
FIG. 9 is a graphical representation of channel state information for the subroutine of FIG. 8 in accordance with an aspect of the present disclosure.

To demonstrate this relationship, FIG. 9 shows a plot of CSI amplitude values across a range of 30 subcarrier frequencies for a transmitted wireless signal. In FIG. 9, peak amplitude values are observed for the $1^{st}$, $10^{th}$, $18^{th}$ and $26^{th}$ subcarriers. This is true for all interfering objects. Yet regardless of which subcarrier is observed, the magnitude of the amplitude correlates to the size of the object. For instance, the presence of a large metal box results in a greatest amplitude, the presence of a medium metal box results in the next greatest amplitude, and presence of a small metal box results in the smallest amplitude among metal boxes.

Figure 10:
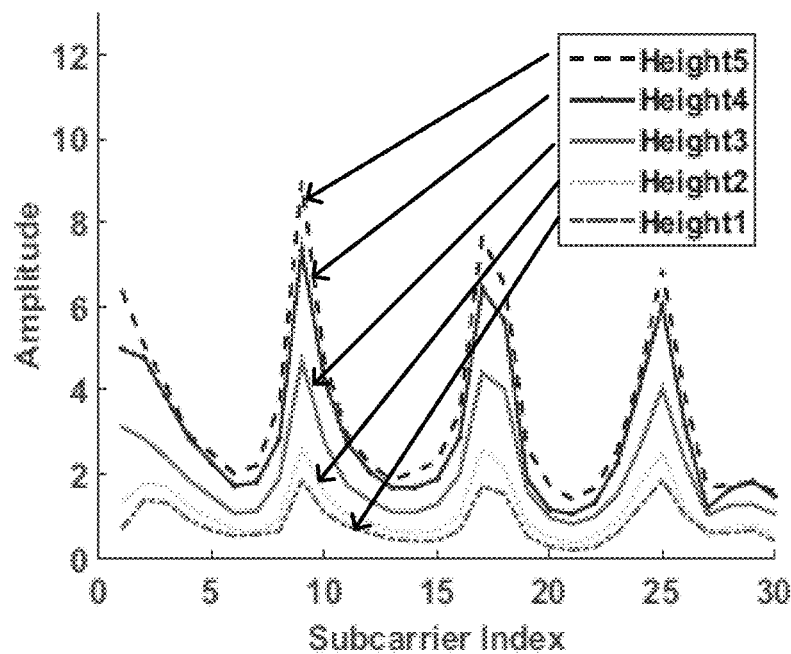
FIG. 10 is a graphical representation of a classification for various heights of detected objects based on channel state information values.
Figure 11:
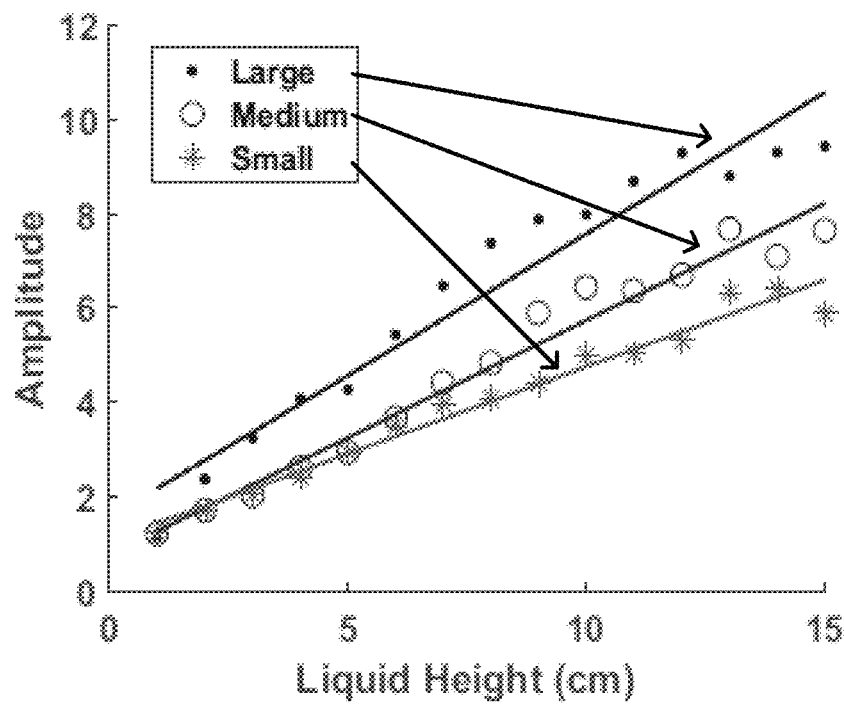
FIG. 11 is another graphical representation of a classification for various heights of detected objects based on channel state information values.

This relationship is further demonstrated in terms of height in FIG. 10, in which a plot of CSI amplitude values across a range of 30 subcarrier frequencies is shown for a transmitted wireless signal. In FIG. 10, peak amplitude values are again consistently observed, this time for the $9^{th}$, $17^{th}$ and $25^{th}$ subcarriers, and this remains true for all interfering objects. Yet regardless of which subcarrier is observed, the magnitude of the amplitude similarly correlates to the height of the object (e.g., the height of a liquid stored in a container). For instance, the presence of a tall object (Height 5) results in a greatest amplitude, the presence of a medium-tall height object (Height 4) results in the next greatest amplitude, and so on. The collective correlation between size (large, medium, small), height (x-axis) and CSI amplitude (y-axis) is further illustrated in FIG. 11, in which each of the height of an object and its overall size is shown to contribute to the magnitude of the CSI amplitude value.

At block 840, the CSI amplitude values may be used to determine the size the object. As noted above, the larger an object, the more likely it may be classified as suspicious. Therefore, determining an object size may also be thought of as determining whether that object is suspicious.

Optionally, the subroutine 800 may further include block 850 for determining a shape of the object. For purposes of the present disclosure, "shape" may be thought of as a silhouette of the given object, or in other words, a width of the object and changes in the object's height along the width.

One way of determining object shape is to repeatedly determine object height while the object is moving at a known speed. For instance, an object placed on a conveyor belt may move at a known lateral speed. In such a case, a height of the object may be determined at regular intervals, each determination corresponding to a height (Y direction) of a portion of the object as the object moves a given lateral distance (X direction) along the conveyor belt.

Figure 12:
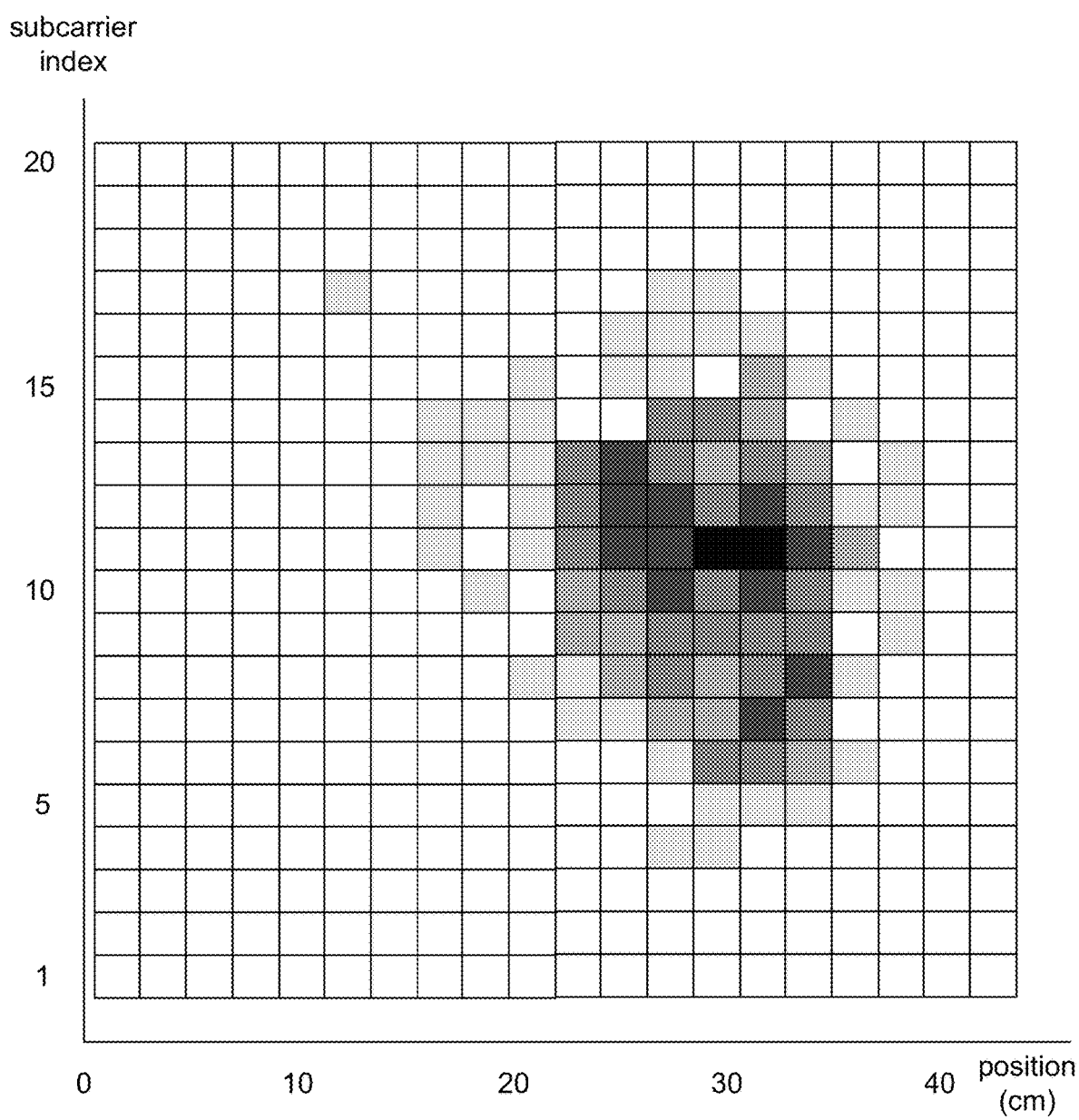
FIG. 12 is a representation of channel state information for a given object based on channel statement information values.

For purposes of demonstration, FIG. 12 illustrates a first example table of collected CSI amplitude values for a plurality of signal subcarriers 1-20, in which the darker shaded boxes correspond to higher amplitudes and the lighter boxes correspond to lower amplitudes. In the example of FIG. 12, the amplitude values of the rightmost column of boxes may be obtained at first time, then the amplitude values of the next rightmost column of boxes at a next time, and so on (whereby the times at which amplitude values of the respective columns of boxes may be equally spaced apart). Since the object may be moving at a constant pace, the amplitude values at the given times may increase or decrease as more or less of the object comes in and out of the "field of view" of the transmitter and receiver (e.g., the "field of view" being a location that causes reflected wireless signals from the transmitter to reach the receiver).

In the example of FIG. 12, it can be seen that amplitude values are relatively high over about 9 measurements, and further that the amplitude values steadily increase to a peak before steadily decreasing. In this example, each measurement a may be spaced apart in time so that the object moves along the conveyor belt about 1.5 cm in the interim. Thus, the time over which the 9 measurements are obtained may correspond to the object moving about 13.5 cm on the conveyor belt.

Figure 13:
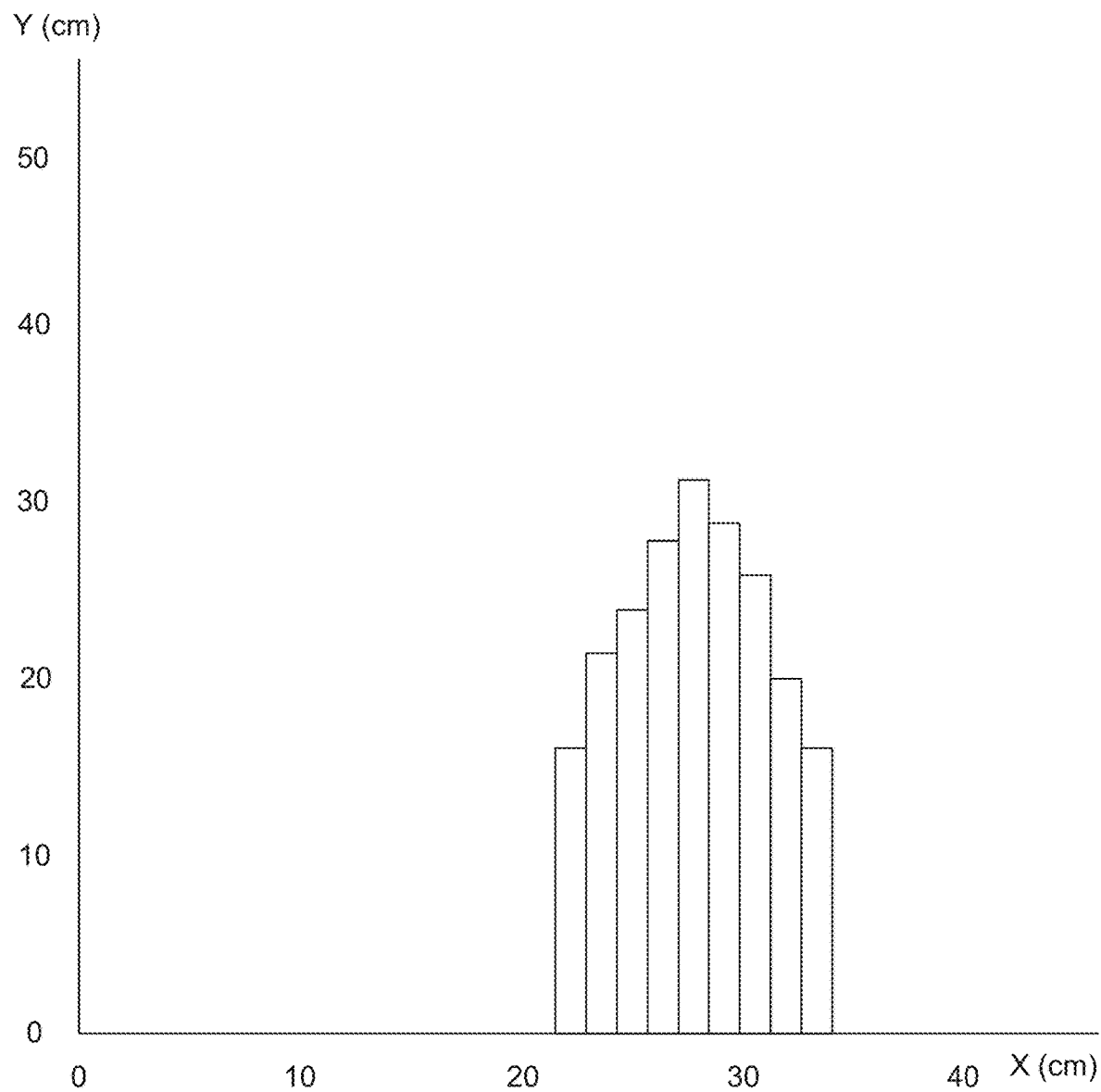
FIG. 13 is an outline of the detected given object extracted from the channel state information of FIG. 12

The graph of FIG. 12 is a three-dimensional plot of CSI amplitude against object position and subcarrier. This information is represented as a plot of object height against object position, for example as shown in FIG. 13, which better approximates a silhouette of the object. Those positions in FIG. 12 having greater CSI amplitude values correspond in FIG. 13 to a greater height of the object at the corresponding position. Conversely, the positions of FIG. 12 having lower CSI amplitude values correspond in FIG. 13 to a lower height of the object at the corresponding position. This results in a silhouette of a relatively narrow object, which may for instance be metal bottle.

Figure 14:
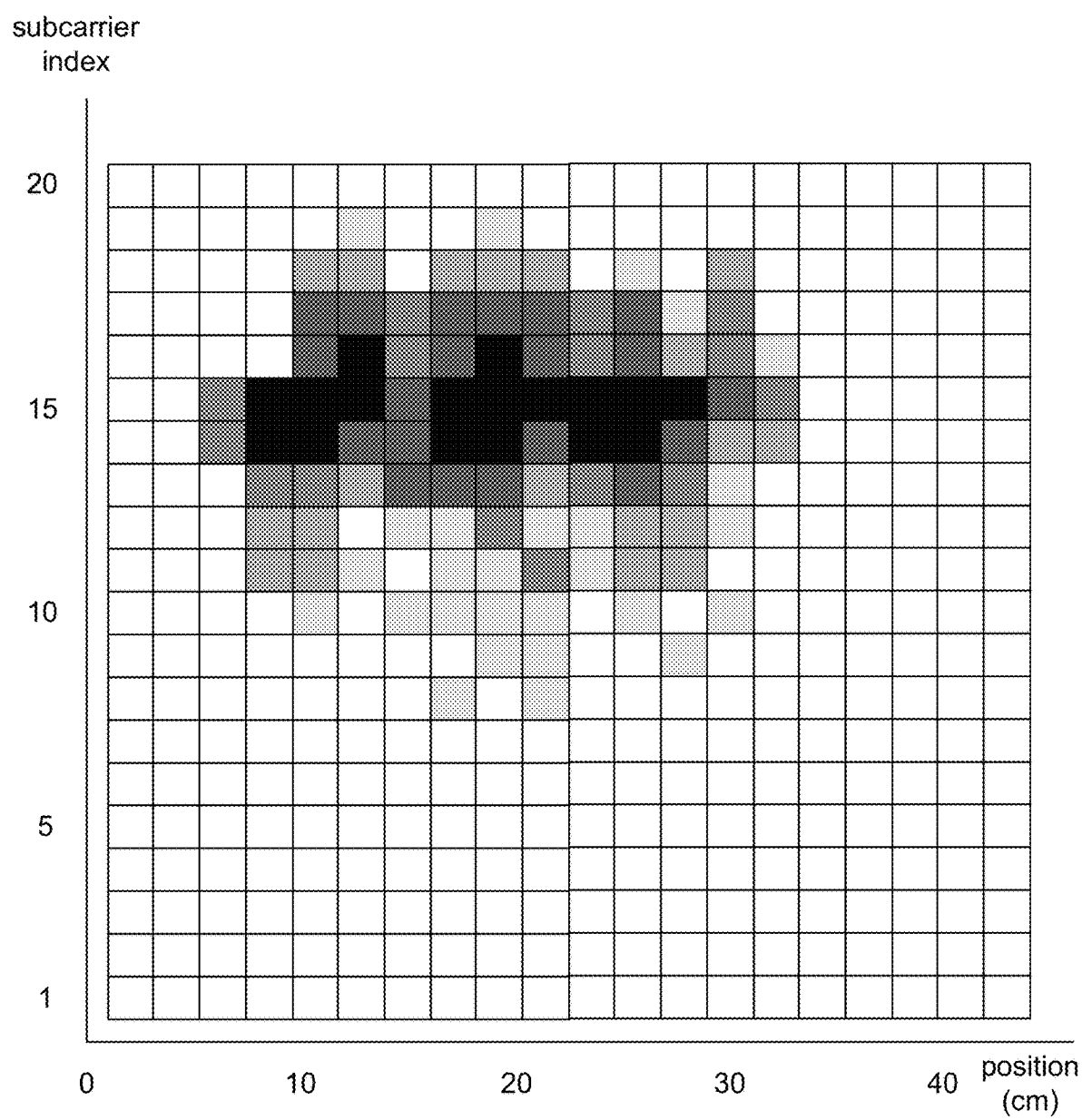
FIG. 14 is a representation of channel state information for a different given object based on channel statement information values.

FIG. 14 illustrates a second example table of collected CSI amplitude values for a plurality of signal subcarriers 1-20. The graph of FIG. 14 may be interpreted in the same manner as that of FIG. 12.

In the example of FIG. 14, it can be seen that amplitude values are relatively high over about 19 measurements, and further that the amplitude values sharply increase to a certain height, generally remain at that height over the measurements, and then sharply decrease. The time over which the 19 measurements are obtained may correspond to the object moving about 28.5 cm on the conveyor belt.

Figure 15:
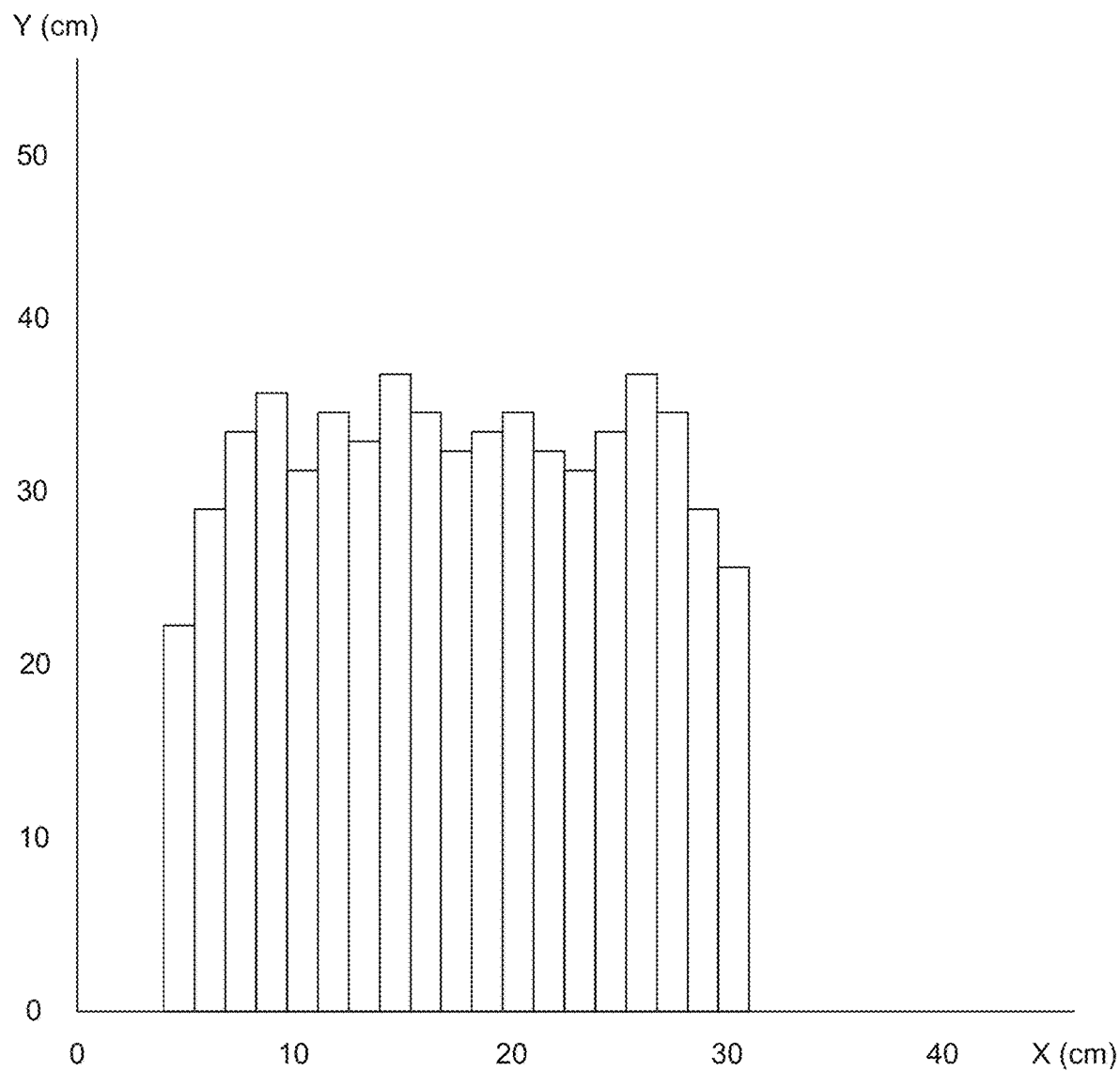
FIG. 15 is an outline of the detected given object extracted from the channel state information of FIG. 14.

The information shown in FIG. 14 may be represented as a plot of object height against object position, for example as shown in FIG. 15, which better approximates a silhouette of the object. Those positions in FIG. 14 having greater CSI amplitude values correspond in FIG. 15 to a greater height of the object at the corresponding position. Conversely, the positions of FIG. 14 having lower CSI amplitude values correspond in FIG. 15 to a lower height of the object at the corresponding position. This results in a silhouette of a relatively wide object having a relatively flat top, which may for instance be metal box.

In some instances, a constructed profile (e.g., the silhouette of FIGS. 13, 15) of the object may be compared to a list of predetermined shape profiles, each predetermined profile corresponding to a give shape. In this manner, it may be determined which shape the object most closely resembles. Furthermore, the determination of whether the object is suspicious may further be based on the comparison, whereby the reconstructed profile matching a profile a dangerous object may result in determining that the object is suspicious.

In the above examples, the determination of object size and shape is described as being based only on reflected wireless signals, and not on refracted wireless signals. However, those skilled in the art will readily appreciate that the CSI complex values obtained by the transmitter positioned to be on the other side of the object may also be used to gather information about object size and shape. Indeed, as shown in FIGS. 6 and 7, CSI complex values and CSI complex difference values may vary based on a size of an object, not merely based on its material. Thus, the CSI complex values may also be used to inform object size and shape.

In the above examples, the system is described as having only one transmitter and only two receivers. However, those skilled in the art will readily appreciate that additional transmitters and receivers may be added to the system in order to achieve more robust data results for a given object. In a similar vein, the above transmitters and receivers are described as having either one or two antennas. However, those skilled in the art will similarly readily appreciate that additional antennas may be added to either or both the transmitters/receivers.

In the above examples, determinations of one or more of an object's properties (e.g., type of material, size, shape, etc.), are made based on measured CSI values. In some examples, these values may be correlated to an object's properties based on stored values. For instance, the ranges of CSI complex values shown in FIG. 6, or the ranges of CSI complex difference values shown in FIG. 7, may be predetermined values stored in memory of the processor included in the system. When the CSI values are obtained, the values may then be compared to the predetermined values in order to arrive at a correlation between the measurements and an object property. In some examples, a measure of accuracy (e.g., how likely the determination is correct) of the determined property may also be determined.

The predetermined values and the object properties to which they are associated may themselves be obtained through a machine learning process.

For instance, in a given system, there may be a large number of transmitter and receiver antenna pairs, and the wireless signals may have a large number of subcarrier frequencies. In such an instance, the machine learning process may involve a k-nearest neighbors (k-NN) based feature selection method, by which CSI-based features are first chosen by their specific subcarriers and antenna pairs, and then hierarchically clustered into classes based on k-NN. The most useful CSI-based features can then be determined by checking whether an error rate for a given feature falls below a threshold error rate when a k-fold cross validation is applied to the clusters.

Furthermore, once the most useful CSI-based features (or clusters of CSI-based features) have been selected, those features may be used to train a machine learning algorithm, for instance using a deep learning algorithm trained on a variety of known objects which may be made of different types of materials, may have different sizes, and may have different shapes. As a result, a range of CSI complex values may be associated with given materials depending on their size and shape, as demonstrated in the predetermined data (comparable to data shown in FIGS. 6 and 7).

In this manner, the CSI complex values associated with object by the machine learning process may be any one or combination of the CSI complex values (e.g., a complex value of the first receiver antenna at a given subcarrier, a complex value of the second receiver antenna at a given subcarrier) and CSI complex difference values (e.g., a difference between the complex values of the first and second receiver antennas at a given subcarrier) that belong to the selected CSI-based features (or clusters of CSI-based features). Thus, the data shown in each of FIGS. 6 and 7 can be integrated within the machine learning process in order to more accurately classify a type of material of a detected object.

In some examples, the machine learning process may be a linear regression model. The linear regression model may be especially useful for liquid volume estimation. For example, the extracted CSI amplitude measurements may be used to derive a diameter of an object based on the wavelength of the signals and the amplitude of the reflected signals. Amplitude may be proportional to the object moving distances, such that a proportional index may be used. Furthermore, the height of the liquid contained in the object may be estimated using CSI amplitude. The estimated diameter and liquid height may then be used to derive an estimated volume of liquid.

In other examples, other machine learning algorithms may be used. For instance, a shape-independent material modeling algorithm may rely instead on extracting unique characteristics of an object's material from CSI data, such as from a combination of phase and amplitude information.

For further instance, a kernel function (e.g., linear kernel, RBF kernel, polynomial kernel) could be used to derive support vectors, which in turn may be used to differentiate the unique characteristics of different objects using a trained detection model. For further instance, classification could be tree-based (e.g., gradient boosting, random forest), whereby CSI complex difference-based features would be used to train the model. For further instance, a convolutional neural network (CNN) may be used to differentiate the unique feature embedded in the CSI data. In some examples, the CNN may be a residual network. These examples may be particularly useful for material classification or for detecting metal objects.

Figure 16:
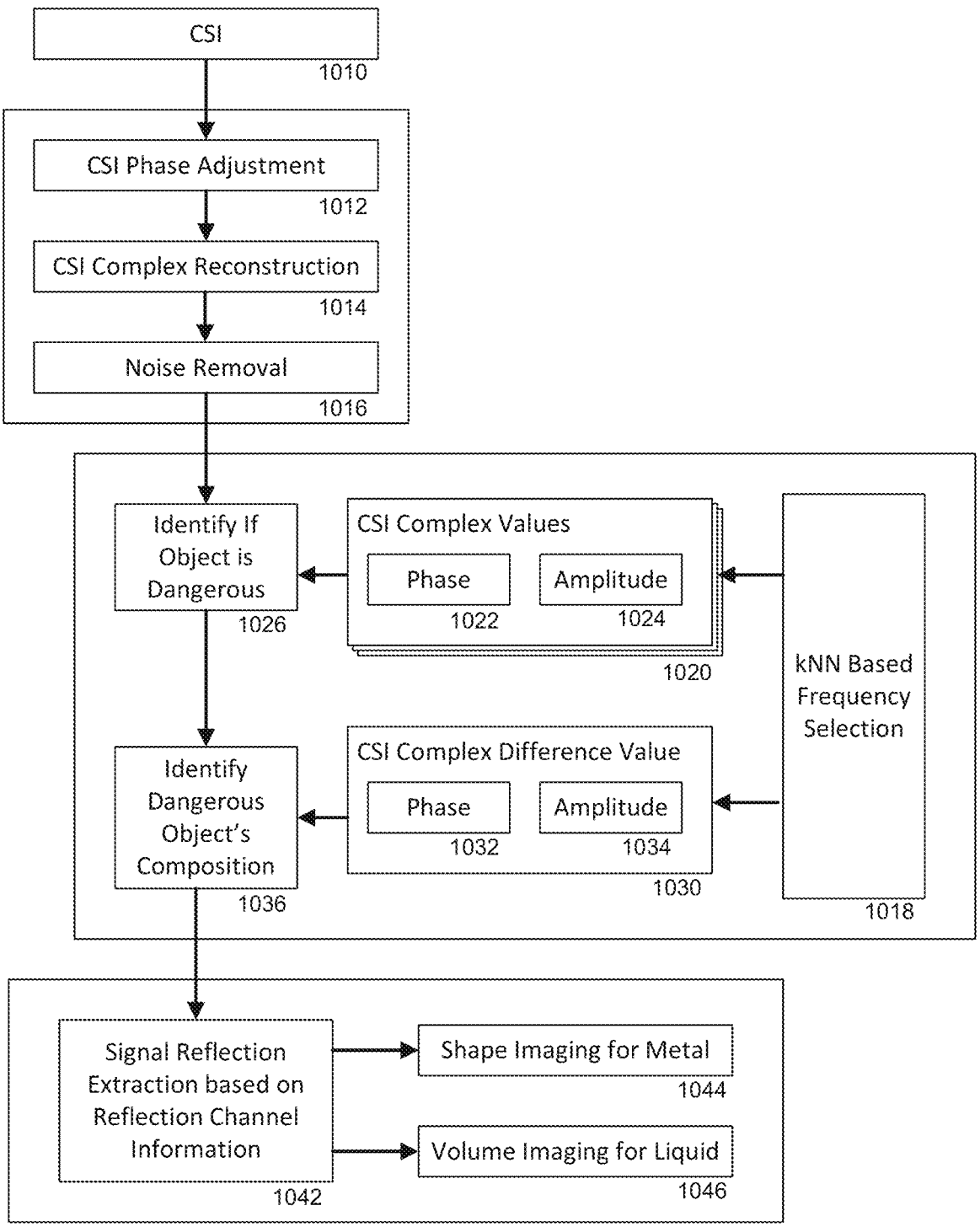
FIG. 16 is another flow diagram of an example routine for detecting a suspicious object in accordance with an aspect of the disclosure.

FIG. 16 shows a flow diagram for an example routine 1000 for determining whether to perform shape or volume imaging of a detected suspicious object. At block 1010, channel state information is collected. For example, this may include the operations of blocks 220 and 240 of FIG. 2.

Blocks 1012, 1014, 1016, 1020, 1022, 1024, 1030, 1032 and 1034 correspond to blocks 312, 314, 316, 320, 322, 324, 330, 332 and 334 of FIG. 3, respectively. The example routine 1000 of FIG. 16 further includes block 1018, which demonstrates that a k-nearest neighbors (k-NN) based feature selection method may be applied to the CSI complex values and differences by which CSI-based features may be chosen and then clustered, although other feature selection methods of classification may be utilized as described above. Based on the clusters or classifications of the CSI complex values 1020, at block 1026, a determination may be made whether the object is dangerous. If the object is determined to be dangerous, then operations may proceed to block 1036, whereby, based on the clusters or classifications of the CSI complex difference values 1030, a determination may be made regarding the dangerous object's composition, such as whether the object is metal or liquid. Lastly, at block 1042, signal reflection extraction may be performed based on the reflection channel information, which is comparable to block 820 of FIG. 8. Depending on whether the object was determined to be liquid or metal, this information may be used to perform shape imaging at block 1044 (in the case of metal) or volume imaging at block 1046 (in the case of liquid).

Systems implementing the above example routines were demonstrated to achieve high accuracy in identifying dangerous objects and their particular composition or type of material. In particular, 97% accuracy has been demonstrated for classifying dangerous from non-dangerous objects, and 99% accuracy for correctly differentiating metal from liquid, for an assortment of small, medium and large size objects. Overall, 99% of dangerous materials were detected, 98% of dangerous-sized metal objects were correctly identified, and 95% of dangerous volumes of liquid were correctly identified. Even when those objects were concealed inside of a bag or other container, the accuracy dropped only to 94% overall, 90% for metal objects, and 92% for liquids. Furthermore, overall accuracy did not drop below 93% regardless of the number of bags or containers used to conceal the object. Even further overall accuracy did not drop below 89% for correctly detecting dangerous new objects that had not been used to train the machine learning algorithm, even when those objects were placed in containers or bags. In the case of metal objects, estimations of object height were consistently within about 0.7-1 cm, with average errors of between about 0.3-0.5 cm. In the case of liquid objects, estimations of volume were consistently within about 35 ml, with a median error of about 16 ml.

The above examples generally describe the system as using one wireless signal transmitter used to detect both a size and a type of material of an object. However, it should be recognized that the underlying principles of the present disclosure are not limited to using a single wireless signal transmitter. Instead, in other examples, separate wireless signal transmitters may be used for detecting a size of an object and detecting a type of material of the object, respectively. For example, a first transmitter may include one antenna and may pair with antennas of a corresponding receiver to identify a type of material of a given object, and a second transmitter may include two antennas and may pair with an antenna of another corresponding receiver to identify a size of the object. The corresponding receiver of this example may be different receivers. Alternatively, if the two transmitters are positioned on opposing sides of the object, then the corresponding receivers may be a single receiver (which is on an opposing side of the object from the first transmitter and on the same side of the object as the second transmitter.

The above examples generally describe a single transmitter-receiver pair being used to identify the material type of an object, and another single transmitter-receiver pair being used to identify the size of the object. However, it should be recognized that the underlying principles of the present disclosure are not limited to using single transmitter-receiver pairs. In fact, collecting data from multiple transmitter-receiver pairs regarding object size, type of material or both, results in a more robust data set, which in turn can improve the accuracy of the above-described systems and methods. In one such example, the system may include any number of wireless signal transmitters and any number of wireless signal receivers all positioned along a perimeter, whereby an object passing within the perimeter may be analyzed using all of the wireless signal transmitters and wireless signal receivers positioned along the perimeter. In such an example, each transmitter may be paired with any number of the wireless signal receivers present along the perimeter, whereby receivers opposite the transmitter relative to the object may be used to detect type of material (provided the receiver includes two antennas or more) and receivers on a same side of the object from the transmitter may be used to detect size (provided the transmitter includes two antennas or more).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of detecting a suspicious object using at least:
   at least one first communication element including a first antenna and a second antenna; and
   at least two second communication elements wherein the at least two second communication elements include:
      a first second communication element positioned on a side of the object that is opposite the first communication element and including a third antenna and a fourth antenna; and
      a second second communication element positioned on a same side of the object as the first communication element and including a fifth antenna, and
   wherein either (i) the first communication element is a wireless signal transmitter and each second communication element is a respective wireless signal receiver or (ii) the first communication element is a wireless signal receiver and each second communication element is a respective wireless signal transmitter,
   the method comprising:
   communicating a first wireless communication between the first antenna and the third antenna;
   communicating a second wireless communication between the first antenna and the fourth antenna;
   communicating a third wireless communication between the first antenna and the fifth antenna;
   communicating a fourth wireless communication between the second antenna and the fifth antenna;
   determining a type of material of the object based on channel state information of the first and second wireless communications;
   determining a size of the object based on channel state information of the third and fourth wireless communications; and
   determining whether the object is a suspicious object based on each of the type of material of the object and the size of the object.

2. The method of claim 1, wherein determining the type of material of the object further comprises determining whether the object is (i) one of a metal or a liquid, or is (ii) a type of material other than a metal or a liquid.

3. The method of claim 2, wherein determining the type of material of the object further comprises determining whether the object is a metal or is a liquid.

4. The method of claim 1, wherein determining the type of material of the object further comprises:
   determining a first complex value of the channel state information of the first wireless communication;
   determining a second complex value of the channel state information of the second wireless communication; and
   calculating a complex difference value that is a difference between the first complex value and the second complex value,
   wherein determining the type of material of the object is based on the first complex value, the second complex value, and the complex difference value.

5. The method of claim 4, wherein determining the type of material of the object further comprises:
   comparing each of the first complex value, the second complex value and the complex difference value to a plurality of predetermined sets of first complex, second complex and complex difference values, each predetermined set of values corresponding to a type of material or a group of types of materials; and selecting the type of material or the group of types of materials having the predetermined set of values closest to the first complex value, the second complex value and the complex difference value.

6. The method of claim 4, wherein determining the first and second complex values further comprises:

performing phase error correction for the channel state information of the first wireless communication;

performing phase error correction for the channel state information of the second wireless communication; and reconstructing a complex form of the first and second wireless communications based on the respective phase error corrections.

7. The method of claim 1, further comprising:

at a calibration stage:

communicating a first calibration wireless signal between the first antenna and the fifth antenna;

communicating a second calibration wireless signal between the second antenna and the fifth antenna; and determining each of a first estimated channel state of the first or fifth antenna transmitting the first calibration wireless signal and a second estimated channel state of the second or fifth antenna transmitting the second calibration wireless signal based on the first and second calibration wireless signals, wherein determining the size of the object is further based on the first estimated channel state and the second estimated channel state.

8. The method of claim 7, wherein determining the size of the object further comprises:

determining a first amplitude of the third wireless communication;

determining a second amplitude of the fourth wireless communication;

determining a weighted second amplitude that is the second amplitude multiplied by a ratio of the first estimated channel state to the second estimated channel state; and calculating a reflection channel response that is a difference between the first amplitude and the weighted second amplitude, wherein the size of the object is further based on the reflection channel response.

9. The method of claim 8, wherein a greater reflection channel response is indicative of the size of the object being larger.

10. The method of claim 1, wherein the first, second, third and fourth wireless communications are communicated while the object is moving.

11. The method of claim 10, further comprising:

repeatedly determining a size of the object based on channel state information of the third and fourth wireless communications as the object is moving;

constructing a profile of the repeatedly determined size of the object;

comparing the constructed profile to a plurality of predetermined shape profiles, each predetermined shape profile corresponding to a type of shape; and selecting the predetermined shape profile having a value closest to constructed profile; and determining a shape of the object based on the selected predetermined shape profile, wherein determining whether the object is a suspicious object is based further on the determined shape of the object.

12. The method of claim 1, wherein the first communication element is a wireless signal transmitter and each of the at least two second communication elements is a respective wireless signal receiver.

13. The method of claim 1, wherein the first communication element is a wireless signal receiver and each of the at least two second communication elements is a respective wireless signal transmitter.

14. A computer-readable non-transitory medium storing instructions for instructing a processor to execute a method for detecting a suspicious object as recited in claim 1.

15. A system for detecting a suspicious object, the system comprising:

(a) at least one first communication element including a first antenna and a second antenna; and (b) at least two second communication elements, wherein, wherein the at least two second communication elements include:

a first second communication element positioned on a side of the object that is opposite the first communication element and including a third antenna and a fourth antenna; and a second second communication element positioned on a same side of the object as the first communication element and including a fifth antenna, wherein either (i) the first communication element is a wireless signal transmitter and each second communication element is a respective wireless signal receiver or (ii) the first communication element is a wireless signal receiver and each second communication element is a respective wireless signal transmitter; and (c) a processor configured to:

obtain channel state information for each of a first wireless communication communicated between the first antenna and the third antenna, a second wireless communication communicated between the first antenna and the fourth antenna, a third wireless communication communicated between the first antenna and the fifth antenna, and a fourth wireless communication communicated between the second antenna and the fifth antenna;

determine a type of material of the object based on channel state information of the first and second wireless communications; and determine a size of the object based on channel state information of the third and fourth wireless communications; and determine whether the object is a suspicious object based on each of the type of material of the object and the size of the object.

16. The system of claim 15, wherein the processor is further configured to:

determine a first complex value of the channel state information of the first wireless communication;

determine a second complex value of the channel state information of the second wireless communication; and calculate a complex difference value that is a difference between the first complex value and the second complex value, wherein the determined type of material of the object is based on the first complex value, the second complex value, and the complex difference value.

17. The system of claim 16, wherein the processor is further configured to:

compare each of the first complex value, the second complex value and the complex difference value to a plurality of predetermined sets of first complex, second complex and complex difference values, each predetermined set of values corresponding to a type of material or a group of types of materials; and select the type of material or the group of types of materials having the predetermined set of values closest to the first complex value, the second complex value and the complex difference value.

18. The system of claim 16, wherein the processor is further configured to:

perform phase error correction for the channel state information of the first wireless communication;

perform phase error correction for the channel state information of the second wireless communication; and reconstruct a complex form of the first and second wireless communications based on the respective phase error corrections.

19. The system of claim 15, wherein the processor is further configured to, at a calibration stage, determine each of a first estimated channel state of the first or fifth antenna transmitting a first calibration wireless signal and a second estimated channel state of the second or fifth antenna transmitting a second calibration wireless signal based on the first and second calibration wireless signals, wherein the size of the object is determined based further on the first estimated channel state and the second estimated channel state.

20. The system of claim 19, wherein the processor is further configured to:

determine a first amplitude of the third wireless communication;

determine a second amplitude of the fourth wireless communication;

determine a weighted second amplitude that is the second amplitude multiplied by a ratio of the first estimated channel state to the second estimated channel state; and calculate a reflection channel response that is a difference between the first amplitude and the weighted second amplitude, wherein the size of the object is determined based further on the reflection channel response.

21. The system of claim 15, wherein the processor is further configured to repeatedly determine the size of the object as the object moves.

22. The system of claim 21, wherein the processor is further configured to:

repeatedly determine a size of the object based on channel state information of the third and fourth wireless communications as the object is moving;

construct a profile of the repeatedly determined size of the object;

compare the constructed profile to a plurality of predetermined shape profiles, each predetermined shape profile corresponding to a type of shape; and select the predetermined shape profile having a value closest to constructed profile; and determine a shape of the object based on the selected predetermined shape profile, wherein the processor is configured to determine whether the object is a suspicious object based further on the determined shape of the object.

23. The system of claim 15, wherein the first communication element is the wireless signal transmitter and wherein each of the at least two second communication elements is a respective wireless signal receiver.

24. The system of claim 15, wherein the first communication element is the wireless signal receiver and wherein each of the at least two second communication elements is a respective wireless signal transmitter.

* * * * *